United States Patent [19]

Asari et al.

[11] Patent Number: 4,491,302
[45] Date of Patent: Jan. 1, 1985

[54] HOT ISOSTATIC PRESSING APPARATUS

[75] Inventors: Akira Asari, Osaka; Yoichi Inoue, Hyogo; Takahiko Ishii, Kobe, all of Japan

[73] Assignee: Kabushiki Kaisha Kobe Seiko Sho, Kobe, Japan

[21] Appl. No.: 548,095

[22] Filed: Nov. 2, 1983

[30] Foreign Application Priority Data

Nov. 6, 1982 [JP] Japan .......................... 57-168476[U]

[51] Int. Cl.³ ............................................. F27B 17/00
[52] U.S. Cl. ....................................... 266/87; 266/89; 266/252; 425/78; 425/405 H
[58] Field of Search ............. 425/78, 405 H; 266/249, 266/87–89, 252, 255; 432/247, 249

[56] References Cited

U.S. PATENT DOCUMENTS 3,571,850 3/1971 Pohto et al. .................... 425/405 H
3,599,281 8/1971 Boyer ................................. 419/49
3,730,666 5/1973 Bowles ........................... 425/405 H

FOREIGN PATENT DOCUMENTS 424657 10/1974 U.S.S.R. ......................... 425/405 H
825283 4/1981 U.S.S.R. ................................ 425/78

Primary Examiner—L. Dewayne Rutledge
Assistant Examiner—Christopher W. Brody
Attorney, Agent, or Firm—Oblon, Fisher, Spivak, McClelland & Maier

[57] ABSTRACT

A hot isostatic pressing apparatus which includes a pressure vessel, a heater and a heat-insulating layer interposed between the pressure vessel and heater. The heat-insulating layer is formed of at least two layers, i.e., an inner layer and outer layer. The inner layer embraces an object, which is under treatment, and the heater. The inner layer is loadable in and unloadable from the pressure vessel together with the object and heater while maintaining a space, which is embraced by the inner layer, in a state hermetically isolated from the surrounding atmosphere. However, the outer layer is held within the pressure vessel. When the hot isostatic pressing apparatus is incorporated in a modular HIP system, the cooling time is considerably shortened and the efficiency of the HIP treatment is hence improved to a considerable extent.

3 Claims, 3 Drawing Figures

HOT ISOSTATIC PRESSING APPARATUS

BACKGROUND OF THE INVENTION

1. Field of the Invention

This invention relates to the so-called hot isostatic pressing (hereinafter abbreviated as "HIP" for the sake of brevity) apparatus which is adapted to conduct the sintering or densification of a ceramic or metal powder compact in a gaseous atmosphere of high temperature and high pressure, and more particularly to an HIP apparatus equipped internally with a heat-insulating layer and heater, which HIP apparatus is useful to make up a modular HIP system in combination with a cooling station and optionally an unloading station as well as a carrier apparatus adapted to carry a treated object, the heater and the heat-insulating layer together with one of lids of a pressure vessel along the HIP apparatus and the cooling and unloading stations.

2. Description of the Prior Art

An HIP treatment comprises pressing an object isotropically under elevated temperatures while using an inert gas as a pressure medium, and is a technique which has attracted considerable attention in recent years from various fields as a method excellent for producing a sintered dense body from ceramics powder or metal powder or a mixture thereof, squeezing off residual voids in a superhard alloy, or diffusion-bonding metal materials.

Since such an HIP treatment is carried out in an atmosphere of high temperature and high pressure, it is indispensable to conduct it over a long cycle time for raising the temperature, raising the pressure, lowering the temperature and then lowering the pressure in an HIP apparatus which has a special structure and is costly. Therefore, it has been considered to be an important technical subject to shorten the cycle time and to improve the efficiency of each HIP treatment. With a view toward solving the above subject, many attempts have heretofore been made to improve the utilization efficiency of an HIP apparatus in terms of its working hours by conducting the heating, i.e., the temperature-raising step of an object, which step requires a long time period, in a preheating furnace and effecting only the pressure-raising step of the object plus an optional slight temperature-raising step in the HIP apparatus. As a representative example of such attempts, mention should be made of the invention proposed in British patent specification No. 1,291,459. The apparatus of the above British patent certainly has merit in that the cycle time thereof can be shortened. However, it is accompanied by such drawbacks as that it requires a preheating furnace in addition to an ordinary high-pressure and high-temperature treatment apparatus and thus raises the equipment cost, and an extremely great deal of heat is lost due to radiation of heat because the transportation of each preheated object is carried out in the atmosphere. An additional drawback is that, when loading a preheated object in a pressure cylinder, the inner wall of the pressure cylinder may be overheated underneath the preheated object due to the heat of the preheated object and this overheating of the inner lower wall of the pressure cylinder damage the lower hermetic ring. Accordingly, the present assignee made an improvement to the above apparatus and has already proposed, in Japanese Patent Laid-open No. 124,610/1976, an HIP apparatus which is capable of shortening the cycle time and enjoys a high level of safety without adversely affecting any parts of the apparatus such as the pressure cylinder. The features of the invention proposed in the above Japanese patent specification reside in the fact that, in a high-pressure and high-temperature furnace constructed of a pressure chamber which is formed of a pressure cylinder and upper and lower plugs respectively and hermetically sealing the upper and lower openings of the pressure cylinder, a heat-insulating layer disposed within the pressure chamber and a heater arranged inside the heat-insulating layer and adapted to subject an object placed on the lower plug to a treatment such as sintering or bonding in a gaseous atmosphere of high pressure and high temperature, the lower plug, heater and heat-insulating layer are removably provided as an integral unit from the pressure cylinder, the treatment chamber defined by the heat-insulating layer and lower plug is rendered openable, hermetic sealing means are provided with the treatment chamber, gas flow passages are provided with the lower plug so as to communicate the exterior of the lower plug with the exterior and interior of the treatment chamber, and the gas flow passages are communicated with each other by means of a valve. According to the above-noted invention, it is possible not only to shorten the cycle time owing to the preheating of an object but also to minimize the heat loss of the object when carrying the pre-heated object of a high temperature into the pressure chamber. Since the inner wall of the pressure cylinder is not overheated by the heat of the preheated body and the service life of the pressure cylinder can thus be prolonged, the above-noted HIP apparatus is safe. In addition, the preheating can be carried out in vacuum or in an atmosphere of a specific inert gas. It has become possible to use, for the heater and heat-insulation layer, materials which are susceptible to oxidation at high temperatures.

In the meantime, there was also developed the so-called modular HIP system in which one or more auxiliary stations adapted to preheat or cool an object in an inert gas atmosphere is combined with a single unit of such an HIP apparatus as described above, the HIP apparatus and auxiliary stations are connected by a track laid horizontally therebetween, and the object and heater are, after being rapidly depressurized in the HIP apparatus and while being still at a high temperature, unloaded together with the inert gas atmosphere from the HIP apparatus and then separately cooled in the auxiliary station or the object and heater are preheated before loading them in the HIP apparatus.

The above modular HIP apparatus has shortened the cycle time of HIP treatment to a considerable extent and materialized a highly efficient HIP treatment compared with any HIP apparatus used or proposed by that time, because the cooling, preheating, loading and/or unloading of objects are conducted at auxiliary stations while a still further object is subjected to an HIP treatment in the HIP apparatus. Thus, such is expected to find more commercial utility in the future. However, it has also been found that the above modular HIP apparatus is accompanied by the following drawbacks.

Namely, the heat-insulating layer of an HIP apparatus has such high performance that the inner wall of the pressure vessel is maintained at temperatures below 100°–200° C. even when the atmosphere in the treatment chamber is, for example, at 2000° C. and 2000 atms. When cooling an HIP-treated object in an auxiliary station after the object has been treated in the above modular HIP system, the heat-insulating performance of the heat-insulating layer is now too good and the cooling of the object requires a long period of time.

SUMMARY OF THE INVENTION

With the foregoing in view, the present invention has as its object to achieve the shortening of cooling time in addition to the considerable reduction in the length of cycle time owing to the adoption of such a modular HIP system as described above, thereby attaining a further reduction in the length of cycle time of an HIP treatment.

In one aspect of this invention, there is thus provided a hot isostatic pressing apparatus equipped with a pressure vessel which is constructed of an upright and pressure-resistant cylinder and upper and lower lids, respectively, hermetically fitting over the upper and lower openings of the cylinder, a heater surrounding a space which is located centrally in the cylinder and adapted to receive therein an object to be treated, a heat-insulating layer interposed between the heater and the inner wall of the cylinder, means for supplying a treatment atmosphere-constituting gas so as to subject the object to a hot isostatic pressing treatment in the space, and pressure- and temperature-controlling means, characterized in that the heat-insulating layer is formed of at least two layers which are an inner layer and an outer layer, the inner layer embraces the object and heater therein and is loadable in and unloadable from the pressure vessel together with the object and heater while maintaining the space, which is embraced by the inner layer, in a state hermetically isolated from the surrounding atmosphere, but wherein the outer layer is held within the pressure vessel.

The pressure-lowering and temperature-lowering steps have heretofore been carried out, requiring significant amounts of time, in an HIP apparatus after completing HIP treatment there. Since the HIP apparatus according to this invention permits unloading of the treated object and heater together with the inert gas atmosphere from the HIP apparatus after rapidly depressurizing the HIP apparatus and while such are still at a high temperature and then to cool them separately at an auxiliary station, the cycle time of the HIP treatment has been shortened to a considerable extent and the efficiency of the HIP treatment has been greatly improved. In a conventional process in which a compact is heated at a low pressure for a long time period in an HIP apparatus to preheat the compact and the preheated compact is then pressed by means of a gaseous pressure medium, the heating at low pressure in the HIP apparatus utilizing a structure suitable for heating the compact at high pressures requires a very long period of time and an expensive HIP apparatus is exclusively used for the heating at low pressure during a very long period of time. In contrast to the above conventional process, the apparatus of this invention has made it possible to transfer the treatment chamber which is equipped with a built-in heater and covered with a heat-insulating layer and to effect heating of each object at a low pressure separately in an auxiliary station. Accordingly, the time period in which the HIP apparatus is occupied by the object has also been shortened to a considerable extent, the cycle time of the HIP treatment has been shortened further, and the HIP treatment can thus be carried out with excellent efficiency. If a plurality of auxiliary stations and treatment chambers are provided for a single unit of a HIP apparatus and the cooling, preheating, loading and/or unloading of objects are carried out in the auxiliary stations while a further object is subjected to the HIP treatment in the HIP apparatus, it is possible to load a still further object in the HIP apparatus immediately after completion of the HIP treatment of the further object and the cooling time period of the thus-treated further object in the HIP treatment can be eliminated. Therefore, the cycle time can be shortened further and the HIP treatment of many objects can be carried out semi-continuously using only one HIP apparatus. Accordingly, the HIP apparatus of this invention is enable to considerably lower the product price.

The above-described effects are available when the HIP apparatus of this invention is incorporated in the so-called modular HIP system which makes use of auxiliary stations. Besides the above effects, the temperature of the pressure vessel can be maintained at low levels owing to the improved heat-insulation effect derived from the use of two insulation layers because the heat-insulating layer is divided into two layers, i.e., the inner and outer layers in the HIP apparatus of this invention. This permits avoidance of overheating of the pressure vessel and also saves electricity required for the HIP treatment. In the cooling station, it is only the inner layer that is subjected to cooling. Thus, the cooling is accelerated and the treatment cycle time can thus be further shortened. This permits the use of fewer cooling stations and simplification of the overall HIP system. Owing to such additional effects of the HIP apparatus of this invention, the adoption of the modular HIP system on an industrial scale is expected to be promoted.

The above and other objects, features and advantages of the present invention will become apparent from the following description and the appended claims, taken in conjunction with the accompanying drawings.

DETAILED DESCRIPTION OF THE PREFERRED EMBODIMENTS

Figure 1:
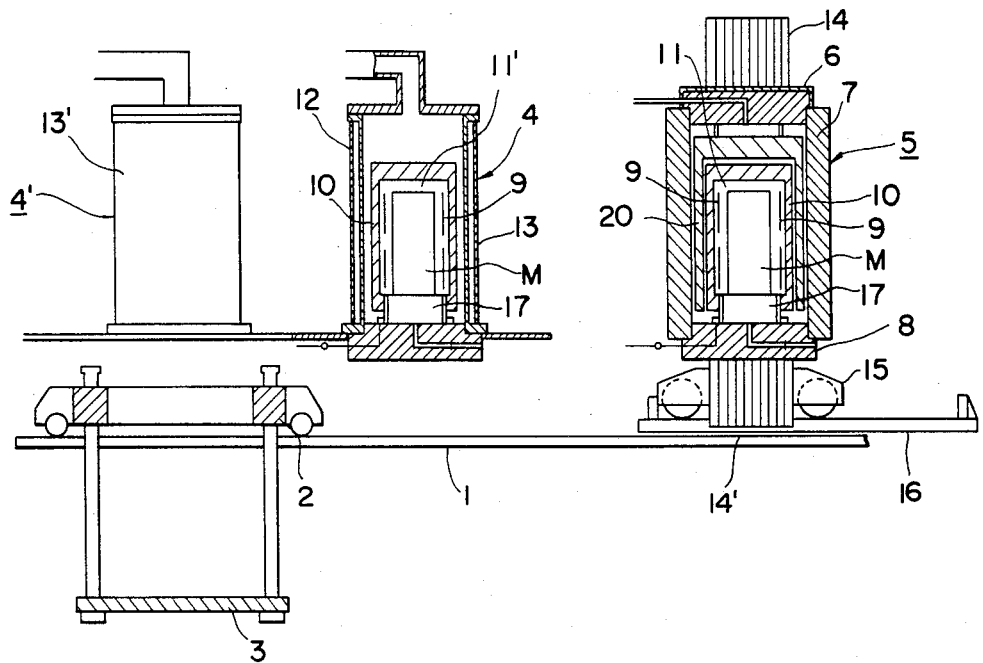
FIG. 1 is a partly cross-sectional schematic view of a modular HIP system in which an HIP apparatus according to one embodiment of this invention has been incorporated.

Referring first to FIG. 1, numeral 1 indicates a track. On a carrier car 2 movably positioned on the track 1, there is mounted a support table 3 which is displaceable up and down by means of known or commonly-used drive means (not illustrated) such as, for example, drive means of the chain hoist, worm gear, rack or piston type. Over the track 1, a plurality of auxiliary stations 4, 4', . . . and an HIP apparatus 5 are serially provided along the track 1. The HIP apparatus 5 is constructed principally of a pressure vessel which is formed of an upright and pressure-resistant cylinder 7 hermetically closed at the top thereof with an upper lid 6 defining a flow passage for a gaseous pressure medium and a lower lid 8 detachably fitted over a lower part of the cylinder 7, and a treatment chamber 11 surrounded by an inverted glass-shaped insulating layer 10 mounted on the upper surface of the lower lid 8, received in the pressure vessel and having a heater 9 located therein. The upper lid 6 and lower lid 8, which are both applied on the pressure cylinder 7, are held under pressure between press frames 14, 14'. Owing to the above structure, the treatment chamber 11 may be taken out of the HIP apparatus 5 by unloading the heat-insulating layer 10 and lower lid 8 as an integral unit from the pressure cylinder 7. On the other hand, the auxiliary stations 4,4', ... have individually an internal volume large enough to completely enclose the heat-insulating layer 10 therein and, if necessary, may each be provided with a dome-shaped vessel 13 which is equipped on the circumference thereof with a jacket 12 for a cooling medium. The lower opening of the dome-shaped vessel 13 is formed of such a size and shape that the lower lid 8 can be fitted over the lower opening.

The inner heat-insulating layer 10, heater 9 and object M, which is now under treatment, are loaded on the support table 3 of the carrier car 2 and may be positioned directly underneath the upright and pressure-resistant cylinder 7 or one of the dome-shaped vessels 13,13', ... by causing the carrier car 2 to run. By operating the lifting means of the carrier car 2 at the above position, it is possible to load or unload the inner heat-insulating layer 10, heater 9 and object M in or from the pressure cylinder 7 or the one of the dome-shaped vessel 13,13', ....

In FIG. 1, there are illustrated three treatment chambers, namely, a first treatment chamber 11 loaded in the HIP apparatus 5, a second treatment chamber 11' loaded in the auxiliary station 4 and a third treatment chamber prepared for the loading of an object, two auxiliary stations 4,4' and one HIP apparatus 5. The press frames 14,14', which are adapted to hold under pressure the upper lid 6 and lower lid 8 of the pressure vessel therebetween, can travel on a track 16 while being loaded on a car 15 and can alternate between the operating position and a retreated position.

In a system having such a structure as described above, an additional heat-insulating layer 20 is provided within the HIP apparatus 5 as a feature of the present invention. The heat-insulating layer 20 may be supportedly suspended for example from the upper lid 6 of the pressure vessel so that it remains in the HIP apparatus even after the first treatment chamber 11 has been taken out of the pressure vessel. Accordingly, the heat-insulating layer has a double-layered structure of an outer heat-insulating layer, i.e., the outer layer 20 and an inner heat-insulating layer, i.e., the inner layer 10 within the pressure vessel of the HIP apparatus 5.

The heat-insulating layer is formed of two layers, namely, the inner and outer layers in the drawing. Needless to say, it is readily contemplated to form each of the layers 10,20 into a multi-layered structure.

Figure 2:
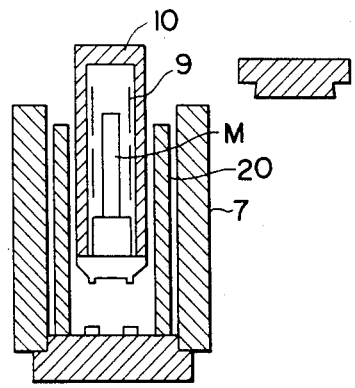
FIG. 2 is a schematic cross-sectional view of an HIP apparatus according to another embodiment of this invention.

In the illustrated embodiment, the heater, inner heat-insulating layer and object are taken out of the pressure vessel together with the lower lid 8. However, they may of course be taken out of the pressure vessel from its top as illustrated in FIG. 2. The embodiment of FIG. 2 is certainly embraced in the present invention.

The apparatus according to this invention has a structure as described above. Its operation will next be described, again, with reference to FIG. 1. In order to subject the object M to HIP treatment by ordinary HIP treatment means, the treatment chamber 11, the interior of which is kept at room temperature or at an elevated temperature is loaded and disposed in the pressure-resistant cylinder 7 by fitting the lower lid 8 carrying the treatment chamber 11 thereon hermetically over the lower extremity of the pressure-resistant cylinder 7. The HIP treatment is then carried out by opening a valve to charge a gaseous pressure medium under pressure into the treatment chamber 11 from a feed line and, at the same time, continuously supplying electricity to the heater 9 to raise the interior temperature of the treatment chamber 11. Pressing is carried out at a high pressure of at least 500 atms or so by using an inert gas such as nitrogen gas, argon gas or helium gas as a pressure medium. The interior temperature of the treatment chamber 11 is raised to a suitable level which is required to allow the material making up the object such as ceramics or metal to undergo plastic flow. The object is densified further and converted to a formed high-density body having a density close to its theoretical close-packed density by the HIP treatment.

After completion of the HIP treatment, the gaseous pressure medium is exhausted through the feed line to bring the internal pressure of the treatment chamber back to normal pressure. Then, the press frames 14,14' are removed and the lower lid 8 is separated from the pressure-resistant cylinder 7 without awaiting any further temperature drop of the interior of the treatment chamber. Thus, the lower lid 8 is separated as an integral unit together with the treatment chamber 11 and the object placed in the treatment chamber 11 from the HIP apparatus 5 and is then positioned at with the auxiliary station 4 for cooling the object.

Here, the treatment chamber 11 which has been taken out of the HIP apparatus 5 together with the lower lid 8 is loaded in the dome-shaped vessel 13 of the auxiliary station 4 while the interior of the treatment chamber 11 is still filled with a hot gaseous pressure medium such as an inert gas and is thus kept isolated from the surrounding atmosphere. An atmosphere-constituting gas is then charged through a feed line and thereafter discharged through an exhaust line in the same manner as described above with respect to the HIP apparatus 5, thereby maintaining the interior of the treatment chamber 11 in the inert gas atmosphere. When a cooling medium such as water is caused to pass through the cooling medium jacket 12 of the dome-shaped vessel 13 instead of applying electricity to the heater, the atmosphere-constituting gas which has been fed in through the feed line and has been heated as a result of absorbing heat from the interior of the treatment chamber 11 of the heater 9 and the like is allowed to undergo heat exchange with the inner wall of the cooling medium jacket 12 and is thus cooled. It is then discharged through the exhaust line.

Such a cooling step has conventionally been carried out over a long period of time in an HIP apparatus. Since it is carried out outside the HIP apparatus in the present invention, the cycle time of the HIP apparatus per se can be shortened to a considerable extent and cooling can be conducted sufficiently in the inert gas atmosphere. It has thus become possible to use, as a material for the heating element or the like, a material which is usable stably at high temperatures but is susceptible to oxidation at elevated temperatures, such as molybdenum or the like.

Upon completion of the cooling in the above manner, the treatment chamber 11 is taken out of the dome-shaped vessel 13 and the treated object is then unloaded from the treatment chamber 11 by using the carrier car 2.

In the above description, the auxiliary station is used as a cooling station. In contrast to the above embodiment, an object may be loaded in the auxiliary station prior to its HIP treatment so that it may be preheated there.

As has been described above, the movable treatment chamber 11 and the HIP apparatus 5 are combined in the apparatus of the present invention. After carrying out an HIP treatment and then lowering the internal pressure of the HIP apparatus to normal pressure, the treatment chamber 11 is taken out of the HIP apparatus immediately without need for awaiting a drop in the internal temperature while holding the treatment chamber 11 in a state practically isolated from the external atmosphere, and is thereafter provided with the auxiliary station as is so that it is subjected to a cooling step. On the other hand, another object which has been loaded in another treatment chamber 11 in a state ready for its HIP treatment is loaded in the HIP apparatus to carry out the HIP treatment of the another object. Therefore, the occupied time of the HIP apparatus, especially, the time period during which the HIP apparatus is occupied for lowering the temperature of the treated object can be significantly shortened, thereby making it possible to make the cycle time of the HIP treatment extremely short. Furthermore, preheating of each object may be readily carried out by combining the treatment chamber 11 with the auxiliary station and the treatment chamber 11 with the preheated object still enclosed therein can be combined with the HIP apparatus for the HIP treatment of the object. Therefore, the equipment cost can be lowered to an extremely low level, the loss of thermal energy can be minimized and the cycle time of the HIP treatment can be further shortened, as compared with a conventional system which requires an expensive furnace exclusively for the preheating of objects or conducts both preheating and HIP treatment continuously in the HIP apparatus.

In an HIP treatment process as described above, the heat-insulating layer of the present invention is formed of two layers, namely, the inner layer 10 and outer layer 20 wherein the inner layer 10 is unloaded as an integral unit together with the treatment chamber 11. However, the outer layer 20 is always held in the pressure vessel. Accordingly, the temperature of the pressure vessel is maintained below 100° C. even when an HIP treatment is applied to the object M, for example, at 2000° C. and 2000 atms. In the cooling station, the heat-insulating layer is formed of the inner layer 10 only. Thus, the cooling velocity of the heat-insulating layer is accelerated.

Figure 3:
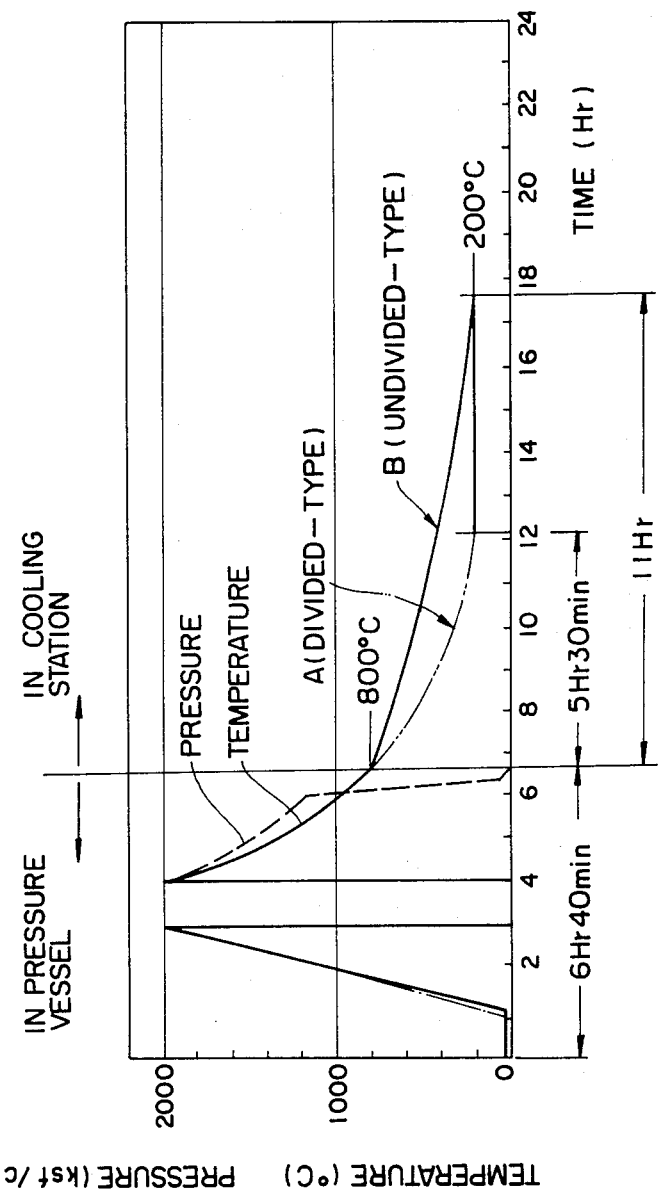
FIG. 3 is a diagram showing the treatment cycle time of an HIP system making use of an HIP apparatus according to this invention in comparison with the treatment cycle time of a conventional HIP apparatus.

With reference to FIG. 3, the treatment chamber may be kept in an inert gas atmosphere even when being transferred from one station to another, provided that an air-tight casing is hermetically provided with the lower lid 8 with the inner layer 10 surrounded by the casing. In addition, it is very advantageous to provide positive cooling means with the cooling station also in the above-described embodiment of FIG. 2.

The results of an operation will next be described. In the operation, HIP treatment was effected using a modular HIP system equipped with an apparatus according to this invention. The resultant product, inner heat-insulating layer and the like were taken out at 800° C. from the pressure vessel and then cooled to 200° C. in the cooling station. It is to be further noted that conventional modular HIP system (B) in which the heat-insulating layer of the HIP apparatus was not divided took 11 hours for cooling the product from 800° C. to 200° C. while the modular HIP system (A) making use of an HIP apparatus according to this invention which employed a divided-type heat-insulating layer needed only 5.5 hours for effecting the same degree of cooling. Thus, the cooling time required has been significantly shortened.

FIG. 3 diagrammatically illustrates the above difference.

Having now fully described the invention, it will be apparent to one of ordinary skill in the art that many changes and modifications can be made thereto without departing from the spirit or scope of the invention as set forth herein.

What is claimed is:

1. A hot isostatic pressing apparatus comprising:
   a pressure vessel which includes an upright and pressure-resistant cylinder with upper and lower lids, respectively, hermetically fitted over upper and lower openings of the cylinder;
   a heater surrounding a space which is located centrally in the cylinder and adapted to receive therein an object to be treated;
   a heat-insulating layer interposed between the heater and the inner wall of the cylinder; and
   means for supplying a treatment gas so as to subject the object to hot isostatic pressing treatment in the space; and
   pressure- and temperature-controlling means, wherein said heat-insulating layer further comprises at least inner and outer layers, wherein the inner layer has both the space for receiving the object and the heater positioned therein and is loadable in and unloadable from the pressure vessel together with the space for receiving the object and the heater, while maintaining the space in a state hermetically isolated from a surrounding atmosphere, with said outer layer remaining within the pressure vessel.

2. A hot isostatic pressing apparatus as claimed in claim 1, further comprising means for loading and unloading the object, heater and inner layer in and from the pressure vessel, respectively, together with the lower lid while maintaining the space in a state hermetically isolated from said surrounding atmosphere.

3. A hot isostatic pressing apparatus as claimed in claim 1, further comprising means for loading and unloading the object, heater and inner layer, as a unit, in and from the pressure vessel through the upper opening of the pressure vessel while maintaining the space in a state hermetically isolated from said surrounding atmosphere.

* * * * *